No. 659,112. Patented Oct. 2, 1900.
B. SYKES.
DEVICE FOR EMPTYING LEACHES.
(Application filed July 27, 1900.)
(No Model.)
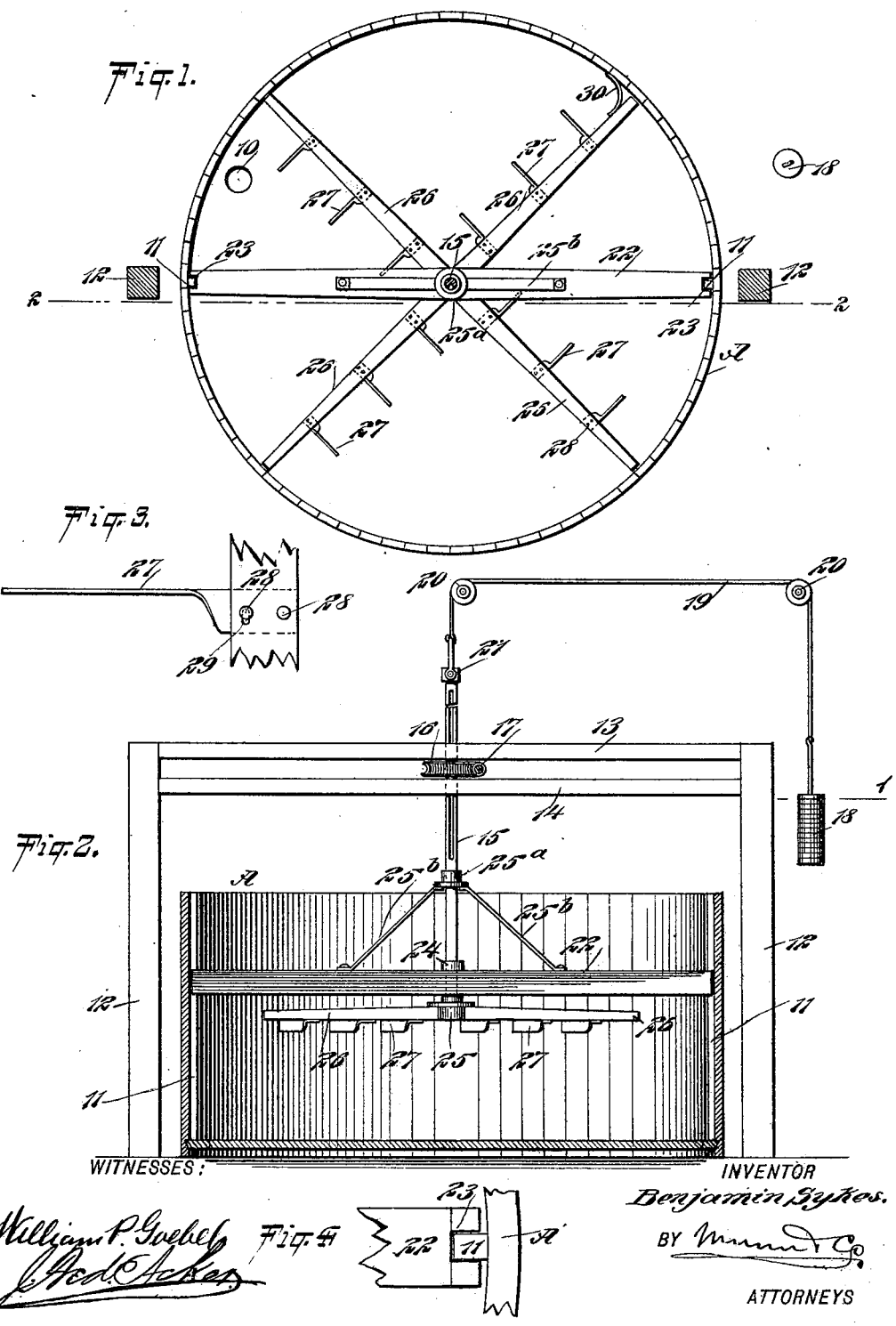
WITNESSES: William P. Goebel
INVENTOR Benjamin Sykes.
BY
ATTORNEYS

UNITED STATES PATENT OFFICE.

BENJAMIN SYKES, OF CURWENSVILLE, PENNSYLVANIA.

DEVICE FOR EMPTYING LEACHES.

SPECIFICATION forming part of Letters Patent No. 659,112, dated October 2, 1900.

Application filed July 27, 1900. Serial No. 25,013. (No model.)

*To all whom it may concern:*

Be it known that I, BENJAMIN SYKES, a citizen of the United States, and a resident of Curwensville, in the county of Clearfield and State of Pennsylvania, have invented a new and Improved Device for Emptying Leaches, of which the following is a full, clear, and exact description.

The invention relates to devices for emptying leaches to be used in establishments for making extracts for use in tanneries and similar works; and the purpose of the invention is to provide simple and effective means for emptying leaches, particularly circular leaches, of spent tanwood or other material employed especially in the tanning industry.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a horizontal section taken practically on the line 1 1 of Fig. 2. Fig. 2 is a vertical section taken substantially on the line 2 2 of Fig. 1. Fig. 3 is a detail view illustrating the manner in which the connecting-blades are attached to the stirrer-arms, and Fig. 4 is a detail view illustrating the manner in which a guide for an actuating-shaft is adjustably mounted in the leach.

The leach A is in the shape of a circular or cylindrical receptacle and is open at the top and closed at the bottom, except that in the bottom of the leach a discharge-opening 10 is formed, usually near the side portion of the leach, as illustrated in Fig. 1. At diametrically-opposite sides of the leach vertical ribs 11 are secured to the inner face of said leach, adapted to serve as guides for a portion of the stirring and collecting devices to be hereinafter described.

Near each outer edge of the leach A, preferably opposite those portions at which the guide-ribs 11 are placed, uprights 12 are secured, which extend above the leach and are usually connected at the top by suitably-spaced cross-bars 13 and 14. A shaft 15 is loosely passed through the cross-bars 13 and 14 into the leach A, the upper portion of the shaft extending above the upper cross-bar 13. The shaft 15 may be turned in any suitable or approved manner. As illustrated, a worm-wheel 16 is placed between the cross-bars 13 and 14, being held to turn with the shaft, yet to permit the shaft to slide therein, and to that end the shaft is shown as provided with a groove which receives a projection from the hub of the wheel 16, and the said wheel is turned by a worm 17, operated in any suitable manner.

The shaft 15 is adjustably suspended through the medium of a series of weights 18, placed upon a suitable support, and the support for the said weights is attached to a rope or cord 19, which is passed over suitable guide-pulleys 20 and is connected with a cap 21, having a swivel connection with the upper end of the shaft 15, as shown particularly in Fig. 2.

The lower portion of the shaft 15 is loosely passed through a guide-bar 22, and this bar is provided with grooves 23 at its ends to receive the guide-ribs 11, as shown in Fig. 1. The bar 22 is raised and lowered with the shaft 15, since the said bar rests upon the hub 25 of a combined agitating and collecting device. A suitable collar 24 is mounted around the shaft above the guide-bar 22, and this collar may be attached to the guide-bar, if found necessary. Preferably braces 25$^b$ are secured to the upper portion of the guide-bar, and these braces are carried up to a guide-sleeve 25$^a$, through which the shaft 15 also passes.

The combined agitating and collecting device consists of a series of arms 26, which radiate from the hub 25, and the outer ends of these arms closely approach the inner side face of the leach, as illustrated in Fig. 1. Each stirrer-arm 26 is provided with a series of collecting-blades 27, attached to the under faces of said stirrer-arms. These blades may be of any desired length, and their main or body portions lie in a vertical plane, while their shanks or inner ends are horizontal. The shanks of the collecting-blades are connected with the stirrer-arms through the medium of bolts 28, which are passed through circular openings in the stirrer-arms and through elongated openings 29 in the shanks of the collecting-blades, as shown in Fig. 3, so that the collecting-blades may be adjusted to suit the work. These collecting-blades serve to plow the tan from the center of the leach and direct the tan to the sides, so that by means of the stirrer-arms 26 the tan can be pushed to the discharge-opening 10.

It sometimes happens when the leach is not entirely round that some of the tan adheres to the inner wall of the leach, and such is removed by placing one or more spring-wipers 30 at the outer ends of the stirrer-arms, which wipers engage with the inner wall of the leach, as shown in Fig. 1.

It will be observed that when the shaft 15 is adjusted by removing some of the weights 18 or adding to said weights the guide-bar 22 and the combined agitating and collecting device described will move with the shaft.

The fuel pitched by the machine can be worked much hotter than by hand and burns more freely in furnaces, and thereby tends to the saving of coal.

Having thus described my invention, I claim as new and desire to secure by Letters Patent—

1. In a device for emptying leaches, the combination, with a leach, of a shaft adjustably suspended in the said leach, an adjustable guide for the shaft, stirrer-arms secured to the lower end of the said shaft and radiating therefrom, and collecting-blades attached to the under faces of the said stirrer-arms and at an angle thereto, for the purpose set forth.

2. In a device for emptying leaches, a leach, a shaft mounted to rotate and having vertical adjustment in the said leach, a guide-bar adjustable in the leach and through which the said shaft is passed, the shaft being provided at its lower end with a hub, stirrer-arms radiating from the said hub and extending to the side portions of the leach, and collecting-blades adjustably attached to the under faces of the stirrer-arms, the said collecting-blades being at an angle to the longitudinal axis of the stirrer-arms, as set forth.

3. In a device for emptying leaches, the combination, with a leach provided with a discharge-opening in its bottom, opposing guide-ribs secured to its inner face, and a frame extending upward at the sides and across the top of the leach, of a shaft mounted to turn in the said frame and having end movement therein, the lower portion of said shaft entering the leach, a swivel-cap connected with the shaft, a series of weights, a support for said weights and a cord, rope or chain attached to said support and to the said swivel-cap, the rope or chain having guides between its ends, a driving device for the shaft, a guide-bar held to slide in engagement with the ribs of the leach, the shaft being passed through said guide-bar, arms radiating from said shaft and extending toward the side portions of the leach, blades adjustably attached to the said arms at an angle thereto, and a wiper carried by one of the arms and arranged for engagement with the inner wall of the leach, as set forth.

In testimony whereof I have signed my name to this specification in the presence of two subscribing witnesses.

BENJAMIN SYKES.

Witnesses:
W. K. WRIGLEY,
JOSEPH R. IRWIN.